(12) United States Patent
Sappok et al.

(10) Patent No.: US 9,873,074 B2
(45) Date of Patent: Jan. 23, 2018

(54) METHOD AND SYSTEM FOR REMOVING RETENTATE FROM FILTERS

(71) Applicant: Filter Sensing Technologies, Inc., Cambridge, MA (US)

(72) Inventors: Alexander Sappok, Cambridge, MA (US); Leslie Bromberg, Sharon, MA (US)

(73) Assignee: CTS Corporation, Lisle, IL (US)

( * ) Notice: Subject to any disclaimer, the term of this patent is extended or adjusted under 35 U.S.C. 154(b) by 119 days.

(21) Appl. No.: 14/702,066

(22) Filed: May 1, 2015

(65) Prior Publication Data

US 2015/0231544 A1 Aug. 20, 2015

Related U.S. Application Data

(62) Division of application No. 13/155,865, filed on Jun. 8, 2011, now Pat. No. 9,144,831.

(60) Provisional application No. 61/352,908, filed on Jun. 9, 2010.

(51) Int. Cl.
*B08B 1/02* (2006.01)
*B01D 46/00* (2006.01)
*B01D 41/04* (2006.01)

(52) U.S. Cl.
CPC ......... *B01D 46/0075* (2013.01); *B01D 41/04* (2013.01); *B01D 46/0068* (2013.01)

(58) Field of Classification Search
CPC . B01D 46/0075; B01D 46/0068; B01D 41/04
USPC ......... 134/32; 55/293, 304; 95/26, 279, 281, 95/282
See application file for complete search history.

(56) References Cited

U.S. PATENT DOCUMENTS

| | | | |
|---|---|---|---|
| 3,867,291 A | 2/1975 | Schmidt, Jr. et al. |
| 5,156,660 A | 10/1992 | Wilson |
| 6,221,255 B1 | 4/2001 | Vadoothker |
| 7,025,811 B2 | 4/2006 | Streichsbier et al. |
| 7,716,922 B2 | 5/2010 | Ehlers |
| 7,767,031 B2 | 8/2010 | Thomas et al. |
| 7,819,978 B2 | 10/2010 | Thomas et al. |
| 7,837,750 B2 | 11/2010 | Katinas et al. |
| 7,856,808 B2 | 12/2010 | Sisken |

(Continued)

FOREIGN PATENT DOCUMENTS

| | | |
|---|---|---|
| DE | 10036597 A1 | 2/2002 |
| EP | 1865161 A2 | 12/2007 |

(Continued)

OTHER PUBLICATIONS

Japanese communication, with English translation, dated Jun. 16, 2015 in corresponding Japanese patent application No. 2013-514336.

(Continued)

*Primary Examiner* — Eric Golightly
(74) *Attorney, Agent, or Firm* — Daniel Deneufbourg

(57) ABSTRACT

A cleaning system and method of cleaning filters that removes the ash in the plugged regions is disclosed. The filter is subjected to vibrations, which serve to loosen trapped and packed retentate from the filter. The loosened retentate is then captured by a collection bin. The cleaning system can be integral with the intended application, such as within an automobile. In another embodiment, the cleaning system is a separate cleaning station, where the filter is removing from its intended application, cleaned, and then reinstalled.

11 Claims, 5 Drawing Sheets

(56) References Cited

U.S. PATENT DOCUMENTS

| | | |
|---|---|---|
| 2001/0013220 A1 | 8/2001 | Schonauer |
| 2007/0277512 A1 | 12/2007 | Winsor |
| 2009/0020136 A1 | 1/2009 | Katinas et al. |
| 2009/0044375 A1 | 2/2009 | Thomas et al. |
| 2011/0146721 A1 | 6/2011 | Meister et al. |
| 2012/0138093 A1 | 6/2012 | Sappok et al. |

FOREIGN PATENT DOCUMENTS

| | | |
|---|---|---|
| JP | 2-146212 A | 6/1990 |
| JP | 5-133216 A | 5/1993 |
| JP | 8-28247 A | 1/1996 |
| JP | 2000-508964 A | 7/2000 |
| JP | 2002-239327 A | 8/2002 |
| JP | 2006-281132 A | 10/2006 |
| KR | 10-0536381 B1 | 12/2005 |
| WO | 97/39816 A1 | 10/1997 |

OTHER PUBLICATIONS

Donaldson Company, Inc. Brochure, "Heavy-Duty Engine/Diesel Engine, Diesel Particulate Filter Thermal Regenerator", Brochure # F111182 (Jun. 2007), 2006, pp. 1-4

Donaldson Company, Inc. Brochure, "Heavy-Duty Diesel Engine, DPF Pulse Cleaner", Brochure # F111181 (Aug. 2007), 2006-2007, pp. 1-4

SAE Technical Paper Series, 2006-01-3256, Oct. 2006, "Pressure Drop and Cleaning of In-Use Ash Loaded Diesel Particulate Filters", pp. 1-13, Nuszkowski, et al.

US DOE DEER Conference, Sep. 2010, "Unraveling DPF Degradation using Chemical Tracers and Opportunities for Extending Filter Life", 20 pages, MIT/Sloan Automotive Laboratory, http://www1.eere.energy.gov/vehiclesandfuels/pdfs/deer_2010/thursday/presentations/deer10_sappok.pdf, Sappok, et al.

FSX Corporate Website, "TrapTester 7 Air Flow Test Bench", http://www.fsxinc.com/site1/products/traptester7.html, 2008, 1 page.

FSX Corporate Website, "SootSucker Series Dust Collectors", http://www.fsxinc.com/site1/products/prod-ssuckers.html, 2008, 1 page.

FSX Corporate Website, "TrapBlaster 7 Pneumatic Cleaner (Stage 1)", http://fsxinc.com/site1/products/trapblaster7.html, 2008, 2 pages.

FSX Corporate Website, "TrapBurner 7 Thermal Cleaner (Stage 2)", http://www.fsxinc.com/site1/products/tburner7.html, 2008, 1 page.

FSX Corporate Website, "DPF Cleaning Technology Feature Comparison/ Comparison of Pneumatic Filter Cleaning Machines", http//www.fsxinc.com.site1/competition/featurecomparison.html, 2008, 2 pages.

FSX Corporate Website, DPF Cleaning Technology Comparison/ Pulse Cleaning Technology vs. TrapBlaster Air Knife Scanning Technology, http://www.fsxinc.com/site1/competition/scan-pulse.html, 2008, 2 pages.

International Search Report/Written Opinion dated Feb. 9, 2012 in corresponding PCT application No. PCT/US2011/039609.

International Preliminary Report on Patentability dated Dec. 20, 2012 in corresponding PCT application No. PCT/US2011/039609.

European communication dated Apr. 22, 2014 in corresponding European patent application No. EP 11793084.2.

Australian communication dated Jun. 10, 2014 in corresponding Australian patent application No. 2011264915.

Office Action—Restriction—dated Feb. 18, 2014 in corresponding parent U.S. Appl. No. 13/155,865.

Office Action dated Apr. 15, 2014 in corresponding parent U.S. Appl. No. 13/155,865.

Office Action—Restriction—dated Sep. 3, 2014 in corresponding parent U.S. Appl. No. 13/155,865.

Final Rejection dated Oct. 14, 2014 in corresponding parent U.S. Appl. No. 13/155,865.

Notice of Allowance dated Feb. 25, 2015 in corresponding parent U.S. Appl. No. 13/155,865.

Notice of Allowance dated Jun. 8, 2015 in corresponding parent U.S. Appl. No. 13/155,865.

| Frequency | Hz | 60 | 120 | 500 | 1000 | 2500 |
|---|---|---|---|---|---|---|
| Half-cycle | s | 8.3E-03 | 4.2E-03 | 1.0E-03 | 5.0E-04 | 2.0E-04 |
| Impulse | m/s | 0.1 | 0.1 | 0.1 | 0.1 | 0.1 |
| acceleration | m/s^2 | 12 | 24 | 100 | 200 | 500 |
| Mass | kg | 70 | 70 | 70 | 70 | 70 |
| Force | N | 840 | 1680 | 7000 | 14000 | 35000 |
| Displacement | m | 4.2E-04 | 2.1E-04 | 5.0E-05 | 2.5E-05 | 1.0E-05 |
| Work | J | 0.35 | 0.35 | 0.35 | 0.35 | 0.35 |
| Power | W | 42 | 84 | 350 | 700 | 1750 |

Figure 6.

METHOD AND SYSTEM FOR REMOVING RETENTATE FROM FILTERS

This application is a divisional application of U.S. patent application Ser. No. 13/155,865, filed Jun. 8, 2011, and issued as U.S. Pat. No. 9,144,831 on Sep. 22, 2015 and also claims priority of U.S. Provisional Patent Application Ser. No. 61/352,908, filed Jun. 9, 2010, the disclosures of which are incorporated herein by reference in their entireties.

BACKGROUND OF THE INVENTION

In many applications, there is a need to effectively and efficiently clean filters. In particular, there is a need to clean expensive filters, restoring them to a condition in which the filters can be reused. Additionally, many filters are difficult to clean using conventional means. A common method of cleaning filters uses forced air to blow off the retentate. There are a number of disadvantages to using forced air for filter cleaning.

First, forced air methods and systems generate airborne particles and dust that may pose health and environmental hazards. Many forced air cleaning systems require large and expensive secondary dust collection and filtration systems.

Second, forced air is not always effective at removing retentate from filters. In particular, filters with small pores, channels, pleats, or the like; or filters in which the retentate has become sintered, stuck, or otherwise adhered to itself or the filter surface may not effectively be cleaned by the use of forced air.

Third, forced air filter cleaning methods are ineffective at removing retentate packed in areas of the filter that experience little-to-no airflow.

Finally, ineffective filter cleaning reduces the useful life of the filter, and may cause efficiency losses or damage to the systems in which the improperly cleaned filters are used.

While there are many types of filters, diesel particulate filters, in particular, are especially difficult to clean using forced air. Diesel particulate filters are used to reduce soot emissions from a wide range of sources, including internal combustion engines. Although there are many types of diesel particulate filters, the most common are ceramic honeycomb-type wall-flow filters. These filters may be cordierite, silicon carbide, mullite, aluminum titanate, or any other suitable material. The wall-flow filters generally contain thousands of small channels, the walls of which are composed of a porous material. The ends of the channels may be alternately blocked at opposite ends of the filter (checkerboard pattern). Particulate-laden exhaust that enters the open end of a filter inlet channel is forced to flow through the porous filter walls to the adjacent outlet channel. The soot particles in the exhaust are trapped in the wall pores or in a cake layer along the channel surface.

In addition to ceramic wall-flow filters, a number of other diesel particulate filters exist including metal foam, sintered metal, and fiber-based (ceramic, glass, paper, and others) filters. These filters may contain pleats, channels, or a porous matrix, among other configurations.

Diesel particulate filters are effective at trapping in excess of 99% of engine-out soot in some cases. The trapped soot is periodically or continuously removed from the filter by regeneration. The regeneration process oxidizes the soot, but leaves incombustible ash behind.

Over time, the incombustible ash builds up in the filter, either in a layer along the filter walls, or in a plug at the back of the filter channels. Ash generally consists of metallic components, originating in lubricant additives, such as Mg, Ca, and Zn forming various sulfates, phosphates, and oxides. Trace metals in fuels (Na, K, Ca, and other elements found in biofuels for example) and engine wear metals and corrosion particles may also contribute. In cases where fuel-borne additives are used for filter regeneration, such as Ce, Fe, Pt, and others, these elements may also contribute significantly to ash accumulation in diesel particulate filters.

The build-up of ash restricts exhaust flow, increases exhaust backpressure, and negatively impacts engine fuel consumption. The ash further reduces the filter's soot storage capacity. In extreme cases, filter plugging can cause excessive exhaust backpressure leading to failure of the engine, exhaust, or machine system. One means of mitigating the negative effects of ash build-up on the filter and system (engine, vehicle, etc.) performance is to clean the filter, i.e., to remove the ash.

Common systems and methods employed to clean diesel particulate filters include forward and reverse blowing, through the use of forced air. Additionally, the filter may be heated (generally up to 650 C) to oxidize and remove soot as well. While filter heating is effective at removing the soot, it is relatively ineffective at removing ash at these temperatures.

One reason that diesel particulate filters are difficult to clean is due to the manner in which the ash accumulates in the filter, as well as its composition. Initially, beginning with a clean filter, the ash accumulates in a thin layer along the filter walls. This thin layer or membrane may actually provide a reduction in filter pressure drop when the filter is also loaded with soot, as the ash layer may prevent soot from accumulating in the filter pores (depth filtration). Generally, the beneficial ash membrane is formed with less than 15 g/L specific ash loading, resulting in an ash layer that is on the order of 50 microns thick; however the pressure drop benefits may be realized with much thinner ash layers and lower specific ash loadings. Depending on the ash composition and properties, these values may differ, however.

As more ash accumulates in the filter, the pressure drop may increase significantly, such that any initial benefit is lost, and for a given level of soot load, the pressure drop across a particulate filter containing soot and ash is greater than the pressure drop across a filter containing the same amount of soot but no ash. Specific ash levels above 25-30 g/L may result in a significant increase in filter pressure drop, loss of soot storage capacity, as well as increase in regeneration frequency.

At these elevated ash levels, the majority of the ash (75% or more) may be packed toward the back of the filter, forming plugs in the filter channels. In some cases, for filters with 150,000 miles of on-road use, the ash may completely plug over 50% of the length of the DPF channels. The ash accumulated in the channel end-plugs may also pack, sinter, or fuse together or to the filter surface. As the ash accumulated in the plugs completely blocks the flow of exhaust through the ash-plugged region of the filter, it contributes significantly to filter pressure drop, generally more so than the porous ash accumulated in a thin layer along the filter walls.

Considering the ash distribution in the DPF, an ideal cleaning process is one that removes all of the ash from the plugs, but leaves a small thin layer along the channel walls. Removing the ash from the end plugs significantly increases the available area for soot deposition, and reduces pressure drop. Leaving a thin layer of ash along the filter walls, preserves the beneficial effect of the ash membrane from preventing soot depth filtration, and provides some reduction in pressure drop.

Conventional forced air systems accomplish exactly the opposite of the ideal cleaning method proposed above. These systems and methods remove much of the ash in the layer along the channel walls (region of the DPF subject to highest flows), but are ineffective at removing ash in the plugged regions (most of the ash) of the filter which experience no, or negligible, flows.

Therefore, an improved cleaning system and method for use with filters, and particularly diesel particulate filters, is needed.

SUMMARY OF THE INVENTION

A cleaning system and method of cleaning filters that removes the ash in the plugged regions is disclosed. The filter is subjected to vibrations, which serve to loosen trapped and packed retentate from the filter. The loosened retentate is then captured by a collection bin. The cleaning system can be integral with the intended application, such as within an automobile. In another embodiment, the cleaning system is a separate cleaning station, where the filter is removing from its intended application, cleaned, and then reinstalled.

BRIEF DESCRIPTION OF THE FIGURES

FIG. 6 shows the requirements for a specific impulse of 0.1 m/s, for a mass of 70 kg.

DETAILED DESCRIPTION OF THE INVENTION

Figure 1:
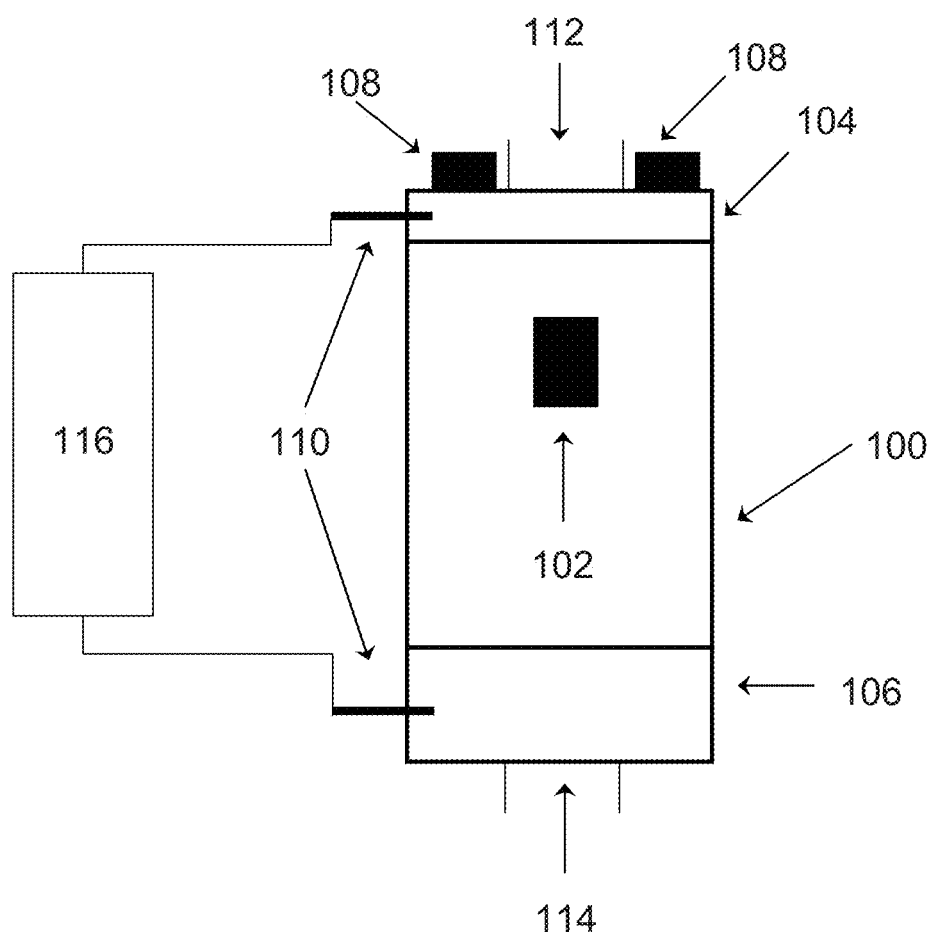
FIG. 1 represents one embodiment of a filter cleaning system.

FIG. 1 depicts a vibration-based filter cleaning system according to one embodiment. A diesel particulate filter 100 is made up of a housing containing the filter element (not shown). The filter element may be of any type, but is generally a ceramic honeycomb contained within a metal housing or can. Together the filter element and housing form the diesel particulate filter 100. The diesel particulate filter 100 may be removed from its application prior to cleaning. An end cap 104 is affixed to the filter outlet, and an ash collection bin 106 is affixed to the filter inlet. The end cap 104 and ash collection bin 106 may be affixed to the filter using conventional v-band clamps or other clamps commonly used in these applications, for example. One or more vibrating elements 102 may be attached to the filter housing 100. Additional vibrating elements 108 may be attached to either or both end cap 104 and ash collection bin 106. Additional vibrating elements 108 are shown attached to the end cap 104.

The ash collection bin 106 may be a container of suitable composition, metal, plastic, composite material, or the like. In another embodiment the ash collection bin 106 may be a filter bag, plastic bag, or any other particle containment system affixed to the diesel particulate filter 100 inlet.

The vibrating elements 102, 108 may be mechanically connected to one or more of the diesel particulate filter 100, end cap 104 or ash collection bin 106. In one example, the vibrating elements 108 may be bolted to the end cap 104 or ash collection bin 106 and the vibrating element 102 may be affixed to the diesel particulate filter 100 using a band clamp, such as a hose clamp.

The vibrating elements 102, 108 may or may not contact the filter element directly. Filter end cap 104 and ash collection bin 106 may or may not be used. In another example, the filter end cap 104 is not used and the vibrating elements 108 may contact the filter element surface directly, such as the inlet or outlet surface. In this example, the vibrating elements 108 and 102 may be hand-held and manually pressed against the filter element surface or filter housing by the operator. The vibrating elements 108 and 102 may be held in place or moved along the diesel particulate filter 100 surfaces, including the outer housing and filter element surfaces.

In one embodiment, the vibrating elements 102, 108 may be conventional vibrating motors, magnetostrictive elements, piezoelectric actuators, pneumatic vibrating elements, or any other device suitable for generating vibrations. Vibrating elements 102, 108 may be supplied with power from an external supply or conventional electrical outlet, and may also be connected to a control system (not pictured). In another embodiment, the vibrating elements 102, 108 may be ultrasonic or acoustic transducers. Additional couplant, such as gel, water, or other suitable material may or may not be used to improve the transfer of vibration energy from the vibrating elements 102 and 108 to the diesel particulate filter 100. The vibrations generated by vibrating elements 102, 108 may be periodic or random, and continuous or pulsed.

The vibrating elements 102, 108 may be affixed in any position or orientation relative to filter 100. In one embodiment, the vibrating elements 102, 108 may be adjusted (position optimized) to target regions of the filter with the highest ash deposits, such as the end-plugs. In many cases, the majority of the ash deposits are found as end-plugs in the back of the filter channels. Positioning the vibrating elements 102, 108 close to the end plugs represents one means of specifically focusing the vibration energy on those regions of the filter 100 with the most accumulated ash. Prior to cleaning, the location and length of the ash deposits may be measured. Measuring the insertion length of a thin wire rod inserted down one or more diesel particulate filter 100 channels represents one means for determining the length of the ash plugs. Measurements of ash deposit location, although not required, may be used to determine the most appropriate location for the vibrating elements 102, 108 to target the ash deposits.

The position of the vibrating elements 102, 108 may or may not be altered or adjusted during the cleaning process. In one embodiment, the vibrating elements 102, 108 may remain fixed during the cleaning process. In another embodiment, the position of the vibrating elements 102, 108 may be continuously or intermittently adjusted during the cleaning process. In one example, vibrations are applied to a specific region of the filter 100 until no more ash is removed. The position of the vibrating elements 102, 108 is then adjusted to focus the vibration energy on another region of the filter 100 still containing ash deposits. Any range of vibrating frequencies and forces may be used. One or more vibrating elements 102, 108 may be used.

In one embodiment, radio frequency-based filter soot and ash probes 110 may also be attached to the end cap 104 and ash collection bin 106 or the filter housing 100. The filter housing 100, end cap 104, and ash collection bin 106 form a microwave cavity. The RF probes 110 may be connected to a control unit and power supply 116. The RF probes 110 may be used to provide information on the amount of ash and soot in the filter as well as to detect filter failures, such as cracking or melting. Any frequency range of operation is suitable. Higher frequencies increase measurement spatial resolution. Measurements from the RF probes 110 may be used to determine when to clean the filter, and also when to stop cleaning the filter, in one example.

Additionally, in some embodiments, one or more connections 112 and 114 may be used. These connections may be part of the end cap 104, the ash collection bin 106, or both. The connections 112 and 114 may allow for the use of air flow, or any other suitable fluid flow to remove the retentate (ash/soot) dislodged by the vibrations. In another embodiment, a vacuum may be applied to at least one of these connections to remove the retentate. Air flow or vacuum is by no means required for system operation, but may be applied. Pressure transducers (not pictured) may also be used to monitor filter 100 pressure drop before, during, and after the cleaning process, to provide one measure of cleaning system effectiveness, and suitability for reuse of the cleaned filter.

The operation of the system shown in FIG. 1 will now be described. Vibrations and forces applied by vibrating elements 102, 108 cause the ash deposits to break-up. In one embodiment, low frequency vibrations, in conjunction with elevated forces, may be applied to break up the ash accumulated in the plugs. This may be followed by high frequency vibrations, but low applied forces, which may be used to cause the dislodged ash to fall out of the inlet section of filter 100 into the ash collection bin 106. One particular method may utilize frequencies below 60 Hz to loosen and break up the ash deposits, and frequencies above 100 Hz to remove the ash from the filter 100. In another embodiment, higher frequencies around 1 kHz may be used. The vibrations may be used to remove ash, soot, and any other contaminant material from the filter 100.

The duration of the applied vibrations may be less than minutes in one example. The applied frequencies and forces may be constant or variable. In another example, low frequency and high force vibrations are applied for 2 minutes followed by the application of high frequency and low force vibrations for another 2 minutes, and the process alternated over the entire cleaning duration, which may be 10 minutes. The duration of the applied vibrations may be any duration, and may be less than or greater than 10 minutes.

During the cleaning process, the location, orientation, and number of vibrating elements 102 and 108 may be varied or adjusted. The applied forces and vibrating frequencies may also be varied. In one example, the vibrations and forces may be varied by adjusting the voltage applied to a vibrating motor, or the internal weights on the motor shaft. In another example, simply placing absorbing material between the vibrating elements and filter (such as rubber matting or foam) may also damp the vibrations. In yet another example, the pressure and flow rate may be varied if pneumatic elements are used.

In one embodiment, the cleaning process may be monitored and controlled using the RF sensors 110. In such a system, the cleaning process parameters (vibration, forces, and displacement) may be adjusted or optimized based on the measured rate of retentate removal. The filter 100 cleaning process may be stopped once filter 100 retentate is reduced to acceptable levels as determined by the RF sensors 110. In another example, visual observations of the ash removal, mass of ash removed, or filter 100 pressure drop, may be used to determine when the cleaning process is finished, or to adjust process parameters. In yet another example, the cleaning process may be terminated when a certain predetermined time has elapsed. Any number of measurement systems and methods including x-ray, terahertz imaging, borescope inspection of the filter channels, and manual measurements of ash plug length using a wire rod may be used to determine ash levels in the filter 100 to adjust cleaning process parameters or determine when to stop filter 100 cleaning.

In another embodiment, the filter 100 may be first heated above 650 degrees C., preferably in the range of 700 to 1,000 degrees C. This heating may induce a volume change in the ash plugs, (expansion or shrinkage) which may facilitate their removal using vibrations. The heating may be accomplished using the existing filter regeneration system on the engine, or via external heaters or furnaces.

Figure 2:
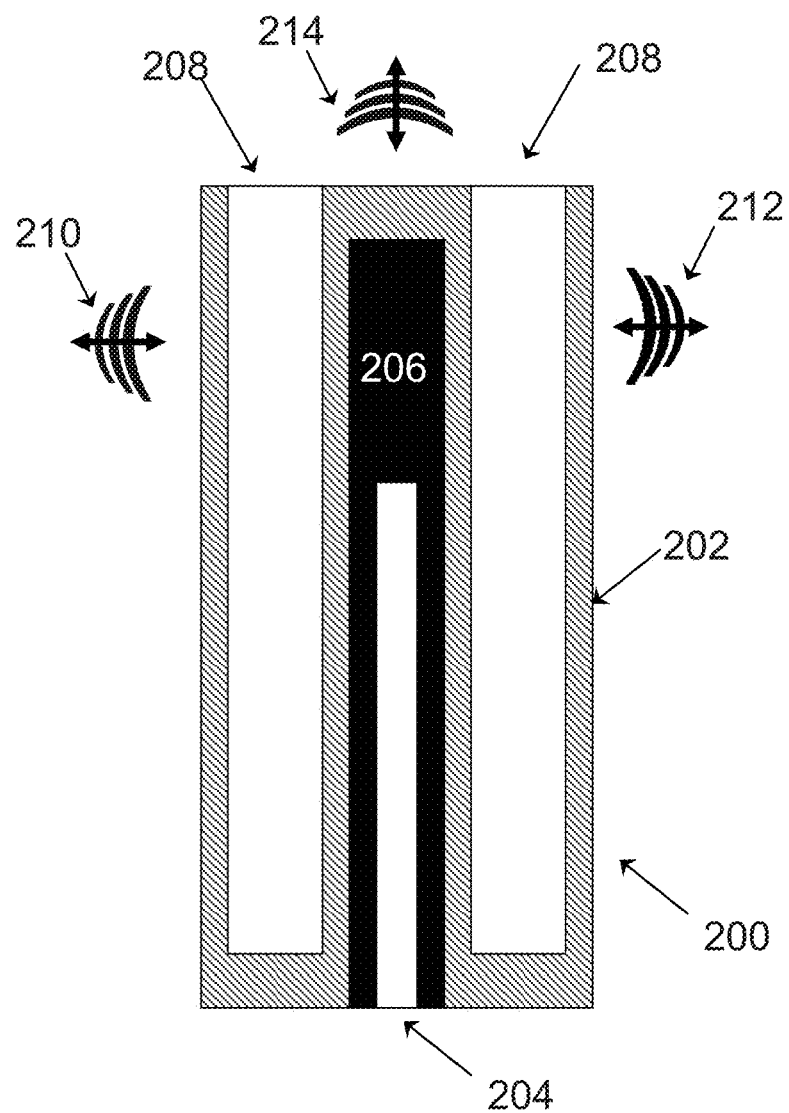
FIG. 2 represents a cross section of several channels in the filter of FIG. 1.

FIG. 2 provides additional details of the vibration cleaning process. A cross section of three channels of a diesel particulate filter 200 is shown. The figure shows the porous channel walls 202 an inlet channel 204 and accumulated ash 206 in a layer along the inlet channel walls and in a plug at the back of the channel. Two outlet channels 208 are also shown. Applied vibrations 210, 212, and 214 are schematically depicted.

The vibrations may be applied perpendicular to the channels as in 210 and 212 or parallel to the channels as in 214, or at any angle or orientation to the channels and filter 200. The orientation of the applied vibrations may or may not change during the cleaning operation. The vibrations may be induced on the channels or filter directly, or through the filter housing. The vibrations 210, 212, and 214 are used to break up, dislodge, and remove the ash or retentate 206 from the channels. In one embodiment, vibrations perpendicular to the channels 210 and 212 may be used to break up and loosen the ash plugs and deposits 206. The loosened ash deposits may be removed from the channel 204 by application of parallel vibrations 214 causing the loosened ash to move down the channel 204 and fall out of the filter. Flows of air or other gases or liquids may or may not be used to aid in ash removal. Any orientation of the vibrations 210, 212, and 214 may be used in any sequence.

Figure 3:
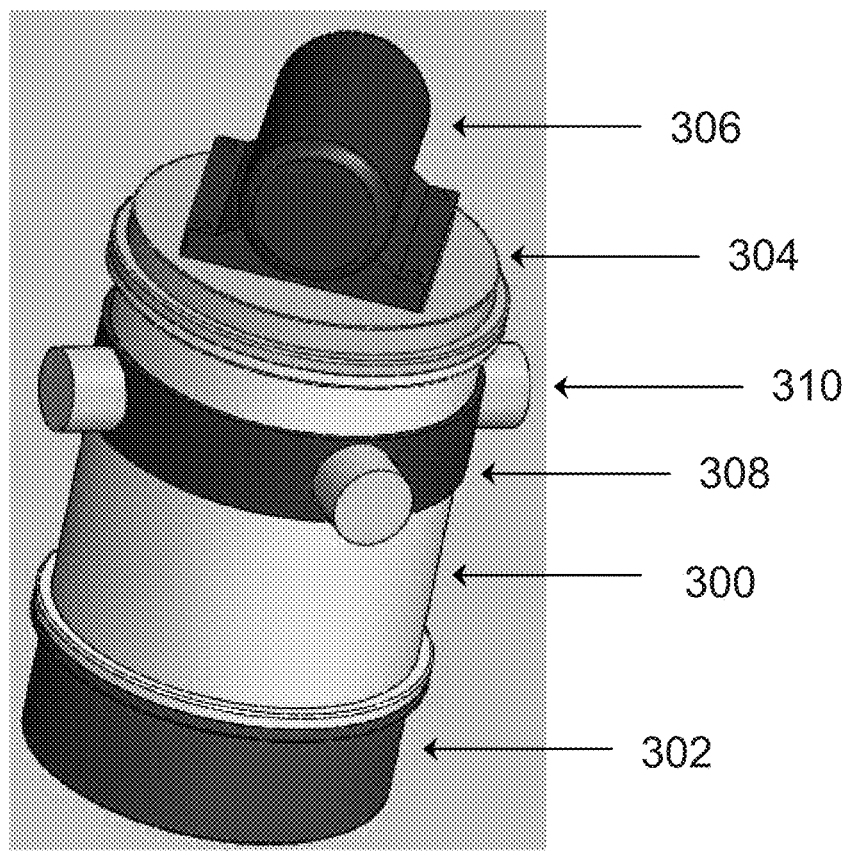
FIG. 3 represents a perspective view of one embodiment of the filter cleaning system.

FIG. 3 presents a particular embodiment showing a particulate filter 300 to which an ash collection bin 302 and end cap 304 have been fixed. A vibrating motor 306 is mounted to the top of the end cap 304. A vibrating collar 308 is also mounted around the circumference of the filter 300. The vibrating collar 308 may contain one or more vibrating elements 310 such as magnetostrictive elements or other suitable elements. The position of the vibrating collar 308 may be adjusted during the cleaning process to target areas of the filter 300 containing high concentration regions of ash or ash that is difficult to remove, such as in the end plugs.

Although the vibrating elements 306 and 310 are shown mounted on the housing 300 or caps 304 externally to the filter element contained within housing 300, the vibrating elements may be mounted directly on the filter element, such as by placing the vibrating motor 306 directly on the face of the filter, in one example. In another example, the filter element may be removed from its housing 300 prior to application of the vibrations.

Application of vibrations from elements 306 and 310 cause the ash to be dislodged and fall into the ash collection bin or bag 302. In this manner, no airborne ash dust is created.

Figure 4:
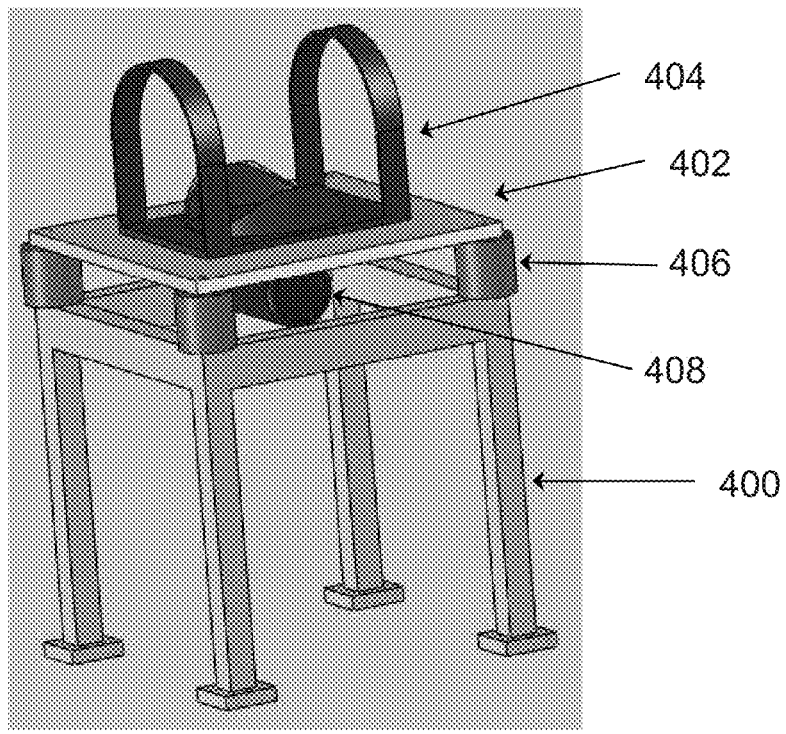
FIG. 4 represents a filter cleaning station.

FIG. 4 depicts an ash cleaning station. The station is comprised of a support structure 400, isolating elements 406, and a support surface 402. One or more vibrating elements 408 are fixed to the support surface 402. The vibrating elements 408 may be connected to a power supply and control unit (not shown). The support surface 402 is physically connected to the support structures 400 via isolating elements 406, which serve to reduce the transfer of vibrations from support surface 402 to support structure 400.

A filter fixture 404 may be connected to support surface 402. The support fixture 404 allows a filter to be mounted in the horizontal or vertical direction, or any direction chosen by the operator. The support fixture 404 may or may not be used. In the event the fixture 404 is not used, the filter (not pictured) may be held in place manually by the operator, or some other means.

The vibrating element 408 is used to induce vibrations in the support surface 402 which are then transferred to the filter placed on the support surface 402. The position of the filter on the support surface may be varied during the cleaning process. The filter placed on the support structure 402 may or may not contain an end cap 304 and an ash collection bin 302 as shown in FIG. 3. If the filter does not contain an end cap 304 or ash collection bin 302, an enclosure or ash collection bin or system may be mounted on support surface 402 to collect and contain the ash removed from the filter.

The vibrations induced on the filter placed on the support structure 402 by vibrating element 408 are used to loosen, dislodge, and remove the ash from the filter. The filter may have additional vibrating elements fixed directly to it, as shown in FIG. 1 and FIG. 3, or vibrating element 408 may be the sole source of the vibrations. One or more vibrating elements 408 may be used. The frequency, force, displacement, and other process control parameters may also be adjusted.

Figure 5:
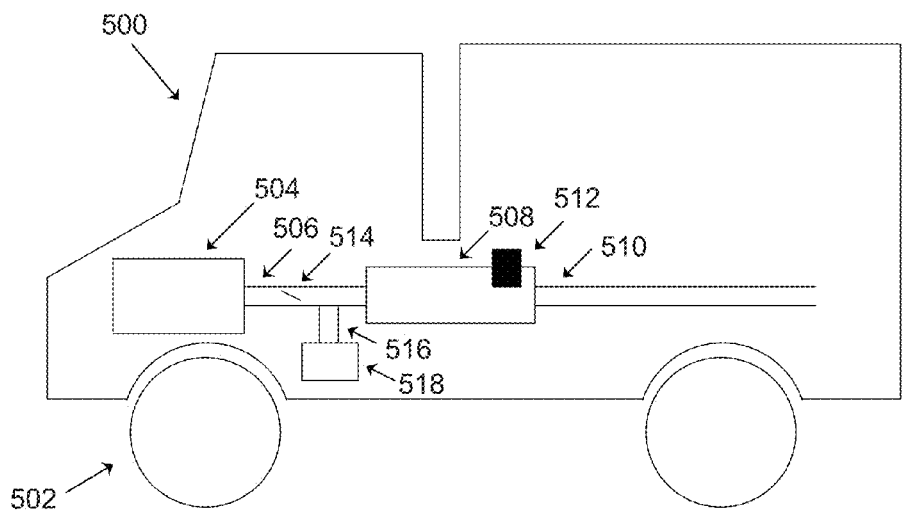
FIG. 5 represents a filter cleaning system integrated with a machine, such as a vehicle.

FIG. 5 shows a vibration-based filter cleaning system applied directly to a diesel particulate filter 508 installed on machine 500. Machine 500 may be any machine containing a particulate filter 508. The machine 500 may be stationary or contain one or more traction devices 502 for moving the machine. Particulate filter may be connected to an engine 504 via a conduit 506. Exhaust from the filter 508 may be directed away from the machine 500 via conduit 510. The particulate filter 508 and conduit 506 and 510 may be oriented horizontally, vertically, or at any angle with respect to the machine 500.

One or more vibrating elements 512 may be attached to filter 508. The vibrating elements 512 may further be connected to a power supply and controller, not shown. A connection 516 may be used to allow for an ash collection bin 518 to be connected to exhaust conduit 506. A valve, plug or gating mechanism 514 may also be inserted into exhaust conduit 506. The gating mechanism 514 has a first position where exhaust flows from the engine 504 to the filter 508, and a second position where retentate flows upstream from the filter 508 to the ash collection bin 518.

The vibrating element 512 may be used to loosen, dislodge, and remove ash from filter 508 while it is still installed on machine 500. In one example, the ash thus dislodged and removed, is blown from the filter 508 and exhaust conduit 506 by application of reverse flow directed into exhaust conduit 510 with the engine off. A source of fluid flow, such as an air compressor or blower, may be in communication with conduit 510 to blow fluid upstream through the filter 508. The ash may be carried by this flow into collection bin 518 via a conduit 506. The collection bin 518 may be a container, bag, or second filter element. The collection bin 518 may be removed to dispose of the collected ash. Valve, plug or gating mechanism 514 may or may not be used to prevent the ash from blowing to the engine 504. Application of reverse flow may or may not be required to remove the ash from the system. A vacuum system (not pictured) may be connected to connection 516 in place of the collection bin 518, in another example. In another embodiment, filter cleaning may be accomplished using vibrations alone, such as when the filter 508 is mounted in a vertical orientation.

A particular example of a cleaning method will now be discussed. The vibrations applied to the filter can be characterized by an impulse on the filter. In this manner, the different "shaking" processes can be scaled and compared. Effective filter cleaning using vibrations can be obtained with relatively short shaking times, if the filter experiences a sudden loss in momentum (that is, it hits a surface). In one example, the speed just before the impact is about 5-10 cm/s without compromising the material integrity. Faster speeds result in substantial vibrations and sound. The specific impulse resulting for an almost instantaneous deceleration of the filter is then <0.1 m/s (normalized by the mass of the filter).

The impulses can be generated in a harmonic manner, by using either mechanical or electrical means using pneumatic vibrators, vibrating motors, magnetostrictive elements, piezoelectric elements, ultrasonic or acoustic transducers, and the like. In the case where magnetostrictive elements are used, they may be driven in a non-harmonic manner, using a square-wave-like driving current.

In a particular example, the filter assembly, which includes the DPF, the can, matting and sensors, has a mass of about 70 kg. If the frequency of the vibrating element is f, then the time the force is applied is, approximately, 0.5/f. The force F required to generate a specific impulse of 0.1 m/s with a mass of 70 kg operating at 500 Hz is about 7000 N. The corresponding acceleration provided by such a system is approximately 10 g.

The required power can also be calculated. The displacement of half a cycle is on the order of 50 microns. Thus the power required to drive the system is about 400 W.

Lower frequencies require lower power but larger displacements. Thus, at 60 Hz, the required force is 800 N, and the power is about 42 W. The acceleration from the shaking motion is however, only about 1 g. FIG. 6 shows the requirements for a specific impulse of 0.1 m/s, for a mass of 70 kg. The lower frequencies can be achieved using conventional motors (unbalanced motors). The higher frequencies can be achieved by using a magnetostrictive element, or other suitable devices.

Magnetostrictive materials are a class of ferromagnetic materials that change their length upon the application of a magnetic field. Several materials experience magnetostriction. At room temperature, TERFENOL-D is one example. In another example, three such actuators are fixed to support surface 402 in FIG. 4 or vibrating collar 308 in FIG. 3. Each actuator is about 1 cm in diameter and 3 cm long, but wider or longer actuators can be used. They are driven by a high power audio amplifier.

The actuators have an elongation of about 100 microns, and require power of a few hundred Watts. The resonant frequency of the relatively short actuator is much higher than the operating frequency, and the field penetration is also fast. Operated at 500 Hz, the 3 actuators deliver about 6700 N, agreeing with the force required for shaking a mass of 70 kg at 500 Hz Using square waveforms to drive the actuator is particularly helpful when the downward motion of the filter assembly is stopped, as it is at this time that it is likely that the ash will dislodge and fall to the receptacle at the bottom. The direction of acceleration can be easily changed by driving the actuators with different phases. It is possible even to drive the support surface 402 (FIG. 4) with different frequencies.

The vibration-based cleaning system and methods disclosed herein may be applied independently, or in conjunction with other cleaning methods such as forced air and thermal regenerators. Measurements of filter loading state and filter integrity (cracking, melting) may or may no be applied. Radio-frequency and microwave sensors, pressure sensors, flow measurements, ultrasonic measurements, x-ray measurements, ash mass measurements, and similar systems and parameters may also be used to determine the effectiveness of the cleaning process. Detectable powders, such as fluorescent powders, in one example, may be introduced into the reverse flow through the filter to detect filter failures. Other powders may also be used. Detection of the powders on the opposite side of the filter from which they were introduced may indicate a failure of the filter. In situ measurements or estimates of filter retentate levels may also be used for real-time control of process parameters such as vibration orientation, frequency, and applied force during the cleaning process for example. The cleaning process may be stopped after a pre-determined amount of time has elapsed, or after a certain amount of retentate has been removed from the filter, or after residual retentate levels in the filter have been reduced to acceptable levels.

To aid the cleaning, charged particles can be added to the flows applied to the filter in order to neutralize charges present in the ash or soot or other retentate that helps it agglomerate and/or hold on to the walls of the filter. For best neutralization, both positive and negative charges can be applied. In the case of both charge polarities, the charges can be in the same space, or they can alternate in space or time. The charges can be generated by external corona discharges, among other production means.

It is intended that the examples and description provided in this disclosure be interpreted as illustrative and not in a limiting sense. The vibration-based cleaning system and methods disclosed are equally applicable to all types of diesel particulate filters, and all type of filters for that matter (pleated filters, paper filters, filter bags being some examples), regardless of material composition, configuration, or design. Further, the retentate may be soot, or ash, or any other material accumulated in filters. The retentate removed from the filter may be accumulated in plugs at the end of the filter channels, in layers on the filter surface, or in the filter pores.

What is claimed is:

1. A method of cleaning retentate from a filter, comprising:
   providing one or more RF sensors for measuring the amount of retentate in the filter;
   applying forced vibrations to a filter element, said forced vibrations being used to dislodge and remove retentate from the filter;
   collecting said retentate in a retentate collection system; and
   stopping the forced vibrations after the amount of retentate is reduced to a level as measured by the one or more RF sensors.

2. The method of claim 1, wherein said applying forced vibrations comprises applying vibrations of a first frequency and a first energy for a first time period to loosen said retentate.

3. The method of claim 2, wherein said applying forced vibration further comprises applying vibrations of a second frequency and a second energy for a second time period, after said first time period.

4. A method of cleaning retentate from a filter, comprising:
   applying forced vibrations of a first frequency and first energy to a filter element for a first time period to loosen and remove said retentate from the filter;
   applying forced vibrations of a second frequency and a second energy for a second time period, after said first time period, said first energy being greater than said second energy; and
   collecting said retentate in a retentate collection system.

5. A method of cleaning retentate from a filter, comprising:
   applying forced vibrations to a filter element, said forced vibrations being used to dislodge and remove retentate from the filter;
   using measurements of filter retentate levels to vary the applied forced vibrations; and
   collecting said retentate in a retentate collection system.

6. The method of claim 1, further comprising using a fluid to remove retentate dislodged by said forced vibrations.

7. The method of claim 1, wherein the direction of the forced vibrations is variable.

8. The method of claim 1, wherein forced vibrations perpendicular or parallel to channels of the filter element are used to break up and loosen retentate in the filter element.

9. A method of cleaning retentate from a filter comprising:
   applying forced vibrations parallel to channels of the filter to dislodge and remove the retentate from the filter; and
   collecting said retentate in a retentate collection system.

10. A method of cleaning retentate from a filter, comprising:
    applying forced vibrations to a filter element, said forced vibrations being used to dislodge and remove retentate from the filter, a location where the forced vibrations are applied varying while the filter is being cleaned; and
    collecting said retentate in a retentate collection system.

11. A method of cleaning ash deposits from a filter, comprising:
    measuring ash deposits in the filter;
    applying forced vibrations to a filter element, said forced vibrations being used to dislodge and remove retentate from the filter, wherein a location where the forced vibrations are applied is based on measured ash deposits; and
    collecting said retentate in a retentate collection system.

* * * * *